United States Patent

Sullivan et al.

[11] Patent Number: 5,827,134
[45] Date of Patent: Oct. 27, 1998

[54] UV-TREATED GOLF BALL

[75] Inventors: Michael J. Sullivan, Chicopee; Thomas Kennedy, Wilbraham, both of Mass.; Viktor Keller, Colchester, Conn.

[73] Assignee: Lisco, Inc., Tampa, Fla.

[21] Appl. No.: 753,704

[22] Filed: Nov. 27, 1996

Related U.S. Application Data

[60] Continuation-in-part of Ser. No. 502,914, Jul. 17, 1995, Pat. No. 5,580,323, which is a division of Ser. No. 195,561, Feb. 14, 1994, Pat. No. 5,456,954, which is a continuation of Ser. No. 933,533, Aug. 24, 1992, abandoned, and a continuation-in-part of Ser. No. 529,361, Sep. 18, 1995.

[51] Int. Cl.$^6$ ............................ B05D 3/06; A63B 37/14; A63B 37/12
[52] U.S. Cl. ......................... 473/372; 473/378; 40/327; 427/553
[58] Field of Search ................................. 473/372, 373, 473/378, 377; 427/553; 40/327

[56] References Cited

U.S. PATENT DOCUMENTS

| | | |
|---|---|---|
| 1,814,170 | 7/1931 | Long . |
| 1,814,312 | 7/1931 | Heane . |
| 1,921,571 | 8/1933 | Jones ........................... 197/6.2 |
| 2,539,303 | 1/1951 | Gerke ........................... 101/32 |
| 3,268,634 | 8/1966 | Glaser ................... 473/378 X |
| 3,781,214 | 12/1973 | Nemoto et al. .............. 260/22 TN |
| 3,803,109 | 4/1974 | Nemoto et al. .............. 260/89.1 |
| 3,804,735 | 4/1974 | Radlove et al. ............. 204/159.23 |
| 3,847,770 | 11/1974 | Radlowe et al. ............. 204/159.23 |
| 3,856,744 | 12/1974 | Radlove et al. .............. 260/40 R |
| 4,086,851 | 5/1978 | Brandell ......................... 101/43 |
| 4,128,536 | 12/1978 | Brodsky et al. ................ 427/54 |
| 4,164,423 | 8/1979 | Schumacher et al. ........... 106/20 |
| 4,178,186 | 12/1979 | Yasui et al. ................... 106/20 |
| 4,200,667 | 4/1980 | Lee et al. ...................... 427/44 |
| 4,251,341 | 2/1981 | Felder et al. ................ 204/159.24 |
| 4,271,258 | 6/1981 | Watariguchi .................. 430/284 |
| 4,303,697 | 12/1981 | Baseden ........................ 427/54.1 |
| 4,374,670 | 2/1983 | Slocombe ...................... 106/20 |
| 4,419,196 | 12/1983 | Beckerick et al. ............ 204/157.1 R |
| 4,508,570 | 4/1985 | Fujii et al. ....................... 106/20 |
| 4,613,403 | 9/1986 | Oyachi et al. ................... 156/643 |
| 4,680,368 | 7/1987 | Nakamoto et al. .............. 528/49 |

(List continued on next page.)

FOREIGN PATENT DOCUMENTS

| | | |
|---|---|---|
| 471079 | of 1992 | European Pat. Off. . |
| 58-098340 | of 1983 | Japan ............................ 427/553 |
| 59-147027 | of 1984 | Japan ............................ 427/553 |
| 61-86263 | of 1986 | Japan . |
| 63-212550 | of 1988 | Japan . |
| 4061870 | of 1992 | Japan . |
| 57-159824 | of 1992 | Japan ............................ 427/553 |
| 2227671 | of 1990 | United Kingdom . |
| 91/11484 | of 1991 | WIPO ............................ 427/553 |

OTHER PUBLICATIONS

English Abstract for JP 6262842, published Sep. 20, 1994.
English Abstract for DE 4312553, published Oct. 20, 1994.
English Abstract for JP 5096028, published Apr. 20, 1993.
English Abstract for JP 4296588, published Oct. 20, 1992.
English Abstract for JP 4122675, published Apr. 23, 1992.
English Abstract for JP 88044558, published Sep. 6, 1988.
English Abstract for JP 63089377, publ. Apr. 20, 1988 & JP 94084098, publ. Oct. 26, 1994.
English Abstract for JP 62034582, publ, Feb. 14, 1987.
English Abstract for JP 58183285, publ. Oct. 26, 1983 & JP 89032792, publ. Jul. 10, 1989.

(List continued on next page.)

*Primary Examiner*—George J. Marlo

[57] ABSTRACT

A method for improving the adhesive bonding of a top coat to a game ball such as a golf ball while simultaneously forming an identification stamp on the ball by (i) stamping an unfinished golf ball with a radiation curable ink and (ii) subjecting the unfinished golf ball to irradiation prior to application of a finish or top coat. Game balls so treated exhibit superior adhesion of a top coat and avoid the need for application of a primer coat between the unfinished golf ball and the outer top coat.

20 Claims, 4 Drawing Sheets

U.S. PATENT DOCUMENTS

| | | | |
|---|---|---|---|
| 4,864,324 | 9/1989 | Shirota et al. | 346/1.1 |
| 4,911,451 | 3/1990 | Sullivan et al. | 273/235 R |
| 5,085,697 | 2/1992 | Kimura et al. | 106/20 |
| 5,156,405 | 10/1992 | Kitaoh et al. | 273/235 A |
| 5,160,536 | 11/1992 | Harris et al. | 106/19 R |
| 5,169,386 | 12/1992 | Becker et al. | 604/49 |
| 5,200,122 | 4/1993 | Katoh et al. | 264/22 |
| 5,248,878 | 9/1993 | Ihara | 219/121.69 |
| 5,266,362 | 11/1993 | Katoh et al. | 427/553 |
| 5,275,646 | 1/1994 | Marshall et al. | 106/20 B |
| 5,391,685 | 2/1995 | Hitomi et al. | 528/75 |
| 5,426,954 | 6/1995 | Sullivan | 427/553 |
| 5,427,377 | 6/1995 | Maruoka | 273/230 |
| 5,542,680 | 8/1996 | Proudfit et al. | 473/378 |
| 5,580,323 | 12/1996 | Sullivan | 473/371 |

OTHER PUBLICATIONS

English Abstract for JP 58087096, publ. May 24, 1983.

Stowe, F.S. and LieBerman, R.A., "Effect of Selected UV Bulbs And Photocatalysts On Multifunctional Arcylate Monomer/Homopolymer Properties" (1985).

McDermott, M., "The Effects of Oligomer Type and Monomer Alkoxylation on Dynamic Surface Tension".

Sinka, J.V. and LieBerman, R.A., "New Developments in Second Generation Radiation Curable products for Printed Circuit Boards and Fiber Optics" *Radiation Curing*, (Nov. 1983).

Stowe, F.S., "Specialty Reactive Monomers For RC Coatings", (first 8 pp.), reprinted from *Modern Paint and Coatings*, (Jun. 1982).

Stowe, F.S., "Specialty Reactive Monomers For RC Coatings", (3 pp.), reprinted from *Modern Paint and Coatings*, (Aug. 1982).

Sinka, J.V. and Mazzoni, D., "Specialty Glycidyl Ethers For Cationic Ultraviolet Cure Systems", pp. 378–388.

Stowe, F.S. and LieBerman, R.A., "Methoxy Ether Acrylates—Novel Ratiation Curing Monomers", pp. 14–71—14–92.

"Sinvacure UVRP (UVRP) inks", Summit Screen Inks Fact Sheet.

L–526–163–A, QureTech Material Safety Data Sheet (Jan. 12, 1995).

L–526–163–B, QureTech Material Safety Data Sheet (Jan. 12, 1995).

L–526–163–C, QureTech Material Safety Data Sheet (Jan. 12, 1995).

Trans Tech America, Inc. UV Curable Pad Printing Ink, Material Safety Data Sheet, (Nov. 3, 1993).

Dando, N.R. et al, "Performance Optimization of 100% Solids, UV–Cure Inks and Wood Fillers Using Aluminum Trihydroxide (ATH) Filler", *Journal of Coatings Technology*, vol. 68, No. 859, Aug. 1996.

UV-TREATED GOLF BALL

RELATED APPLICATIONS

This application is a continuation-in-part of U.S. application Ser. No. 08/502,914, filed Jul. 17, 1995, now U.S. Pat. No. 5,580,323, which is a divisional of U.S. application Ser. No. 08/195,561 filed Feb. 14, 1994, now U.S. Pat. No. 5,456,954, which is a continuation of U.S. application Ser. No. 07/933,533 filed Aug. 24, 1992, now abandoned. This application is also a continuation-in-part of U.S. application Ser. No. 08/529,361 filed Sep. 18, 1995.

BACKGROUND OF THE INVENTION

A high-quality generally clear coating having good resistance to lifting, cracking, and abrasion is important to the production of commercially acceptable golf balls. At the same time, heightened environmental awareness has induced governments to enact laws which place restrictions on emissions of volatile organic chemicals which may be present in primer coats. Although many primer coats are waterborne systems today, primers which contain epoxy resins dissolved in organic solvents may still be used to improve adhesion of a top (finish) coat to a golf ball.

The outer surface of a golf ball must accept a coating which will not chip, peel or flake when subjected to very strong impact force and friction force of golfing. Unfortunately, the adhesion of such coatings to specific plastics used in the production of golf balls is weak. Attempts have been made to improve adhesion of such coatings to the surface of the golf ball. Some approaches to improving adhesion have included roughening the surface of the ball by subjecting it to a flame or sandblasting. Both methods, however, cause damage to the precisely designed and formed dimples of the most recently developed golf balls. The damages have an adverse effect on ball flight. Alternatively, golf balls have been pre-coated with a treatment solution containing ethyleneimine, carbodiimide or a derivative thereof. U.K. Appln. 2,227,671 suggests applying an outer covering layer to a golf ball by molding a cover member around a core member in which, prior to molding, the cover material is provided with the outer layer, i.e., a biaxially-oriented film or a co-extruded film laminate. This outer covering layer is intended to improve the adhesion of a paint or varnish to the ball and/or improve the reception of an identification mark or stamp.

However, each of the above methods still necessitates the application of a primer coat between the molded ball and the top coating. The use of a primer, while currently conventional, has several disadvantages in that it releases volatile organic compounds and is relatively high in cost. As a result, other methods of improving adhesion are under exploration. One attempt at improving adhesion of a paint or lacquer to a golf ball while avoiding the use of a primer coat entails treating a formed uncoated golf ball with an unpolymerizable gas plasma before applying a finish paint coat. U.S. Pat. No. 4,613,403 discloses subjecting golf balls to an inert gas which is energized by applying a voltage and reducing the pressure to the range of 10.00–0.01 Torr. This is performed by placing the golf balls in an apparatus with a sealed casing to create a vacuum for plasma treatment. Since undesirable strong ashing can occur when oxygen is present during treatment, it must be excluded from the casing. The treatment conditions of temperature, gas content, and pressure must be carefully controlled and contained. Accordingly, there is need for a simpler technique to improve adhesion while avoiding the use of primers.

It is known that the adhesion of certain plastic materials to various other materials may be improved when the plastic material has been irradiated. This has been done with, for example, automobile bumpers and side molding, car mats, adhesive tape, and plastic bottles, but these are not products which are expected to suffer the extreme abrasive forces to which a golf ball is constantly exposed. Moreover, these products are not required to absorb the abrasive forces while having a continuing requirement of no peeling of the top coating.

As indicated above, golf balls can be, and commonly are, marked with an identification stamp. Conventionally, this stamp comprises an air drying ink which has excellent adhesion to a golf ball surface. For example, a commercially available ink which is useful on golf balls is an air or forced air drying solvent borne ink available from Summit Screen Inks, No. Kansas City, Mo. The chemical composition of this ink is unknown to the applicants.

UV curable inks are quick-curing inks and therefore are advantageous for use in continuous-type processes in which subsequent treatment of an ink-printed substrate is involved. A number of UV curable inks are known. For example, U.S. Pat. No. 4,271,258 discloses a photopolymerizable ink composition containing acrylate resin, methacrylate monomer or oligomer, acrylate monomer or oligomer, photoinitiator, and a particular type of an epoxy resin. U.S. Pat. No. 5,391,685 discloses a UV curable ink having an isocyanate compound added thereto. U.S. Pat. No. 5,391,685 contends that the ink disclosed therein is particularly well suited for printing on slightly adhesive plastic bases, such as those made of polyoxymethylenes and polypropylenes.

Screen printing on spherical surfaces such as golf balls can be difficult. As a result, pad printing customarily is used for marking golf ball surfaces. However, many of the known UV curable inks are not well suited for pad printing due to difficulties in transferring the ink from a pad to a substrate. Furthermore, UV curable inks that can be pad printed have not been found suitable for use on golf balls. More specifically, when applied to a golf ball, these inks are not sufficiently durable (impact resistant) to withstand multiple blows by a golf club. It would be useful to obtain a highly durable UV curable ink which has favorable pad transfer properties when used for printing indicia on surfaces such as a curved and dimpled surface of a golf ball, and which provides an image having good durability.

SUMMARY OF THE INVENTION

The applicants have determined that certain exposures of golf balls to UV light can improve adhesion of a golf ball cover to a level sufficient to eliminate the need for applying a primer before the application of a top coat. The use of the term "top coat" includes paints, varnishes, polyurethanes, solvent-based urethanes, or any other conventional outer finishes used in the manufacture of golf balls. The method can be practiced without requiring highly specialized equipment to regulate temperature, pressure, and gas concentration. Most importantly, the method results in enhanced adhesion while maintaining a commercially acceptable level of appearance and durability of the golf ball. Furthermore, the applicants have determined that an indicia or identification stamp on a golf ball which comprises a UV curable ink can be cured by the same UV treatment as is employed to improve adhesion of a top coat.

Accordingly, it is an object of the invention in the production of golf balls to eliminate any need for a primer before application of the top coat while avoiding the detriments of gas plasma treatments.

It is another object of the invention to improve the adhesion of a top coat to a golf ball with minimal use and release into the atmosphere of hazardous chemicals.

It is another object of the invention to improve the adhesion of a top coat to a golf ball without damaging the surface of the golf ball.

It is still another object of the invention to treat golf balls at ambient temperatures and pressure.

An object of the invention is to provide a new and improved UV curable ink which is suited for use on a golf ball.

Another object of the invention is to provide a UV curable ink which is particularly well suited for application by pad transfer.

A further object of the invention is to provide a quick curing ink for use on a game ball, such as golf ball, thereby enabling more rapid production.

Another object of the invention is to provide a pad printable, UV curable ink having good impact resistance.

Yet another object of the invention is to provide a game ball, such as a golf ball, having a clear and durable ink image printed thereon.

A further object of the invention is to provide a method for printing an indicia on a game ball, the indicia comprising a UV curable ink.

Yet another object of the invention is to provide a method for applying a smudge resistant and durable indicia to a visible surface of a game ball.

Other objects of the invention will be in part obvious and in part pointed out more in detail hereafter.

The present invention is directed to a method of improving adhesion of the molded surface of a golf ball to a top coating while simultaneously curing an identification stamp on the ball which is formed from a UV curable ink. The method comprises simultaneously exposing the unfinished surface of the golf ball and the uncured ink stamp to ultraviolet light before the application of the top coat. The term "unfinished surface" refers to the outermost layer of a golf ball after the molding process is complete. The preferred surfaces are polyolefin rich. Non-limiting examples of polyolefin-rich surfaces are copolymers of ethylene and methacrylic acid or copolymers of ethylene and acrylic acid. The acids are commonly partially neutralized and used as the metal salts thereof. Such copolymers include, for example, ionomers. As a result of exposure to ultraviolet light at ambient temperatures, the modified golf ball surface bonds more easily to a top coat without application of a primer, exposure to high temperature, or damage to the surface, and the ink which forms the identification stamp is cured.

The invention in a preferred form is a golf ball having a molded, UV-light-exposure-modified outer surface with an array of undamaged dimples and surrounding land areas disposed thereon, an indicia formed on the outer surface comprising a UV curable ink, and a top coat firmly adhered directly to said UV-light-exposure-modified outer surface, the top coat exhibiting resistance to cracking at both the dimples and land areas. The golf ball preferably has a durability comparable to the durability of a golf ball having a non-UV-light-exposure-modified outer surface having the same outer surface and top coat compositions. The ball preferably exhibits top coat adherence at a level less than PC-3, and more preferably less than PC-2, as determined by the Wet Barrel Durability Test procedure.

The UV-light-exposure-modified outer surface preferably comprises polyolefin, and even more preferably comprises an ionomer.

Another preferred form of the invention is a golf ball having a molded, radiation-modified outer surface comprising a neutralized copolymer of ethylene and at least one of methacrylic acid and acrylic acid, an indicia formed on the outer surface comprising a radiation-curable ink, and a top coat firmly adhered over the radiation-modified outer surface.

Another preferred form of the invention is a method for simultaneously improving the adhesion of a coating to an unfinished golf ball surface and applying an indicia to said surface. The method comprises the steps of applying a UV-curable indicia to a portion of said surface and subsequently subjecting said surface to a sufficient degree of UV radiation for a sufficient period of time to both cure the indicia and enhance the adhesion of the subsequent coating.

Yet another preferred form of the invention is a method of making a finished golf ball from an unfinished golf ball without use of a primer coating. The method comprises the steps of (i) forming an indicia on the unfinished golf ball, said indicia comprising a radiation-curable ink, (ii) subjecting the unfinished golf ball to irradiation under conditions sufficient to cure the indicia and enhance adhesion of a subsequent coating, and (iii) after irradiation, placing a finish coating on the unfinished golf ball.

Yet another preferred form of the invention is a method of treating a game ball surface comprising the steps of (i) forming an indicia on said surface, said indicia comprising a radiation-curable ink, and (ii) exposing the surface and the indicia to irradiation under conditions sufficient to both cure the indicia and enhance adhesion of said surface to a subsequent coating. The surface preferably comprises a partially neutralized copolymer of ethylene and methacrylic acid or a partially neutralized copolymer of ethylene and acrylic acid.

A further preferred form of the invention is a game ball having a UV-light-exposure-modified outer surface, an indicia formed on the outer surface comprising a UV-curable ink, and a top coat firmly adhered directly to the UV-light-exposure-modified outer surface. The outer surface preferably comprises polyolefin and more preferably comprises ionomer.

The invention accordingly comprises the several steps and the relation of one or more of such steps with respect to each of the others and the article possessing the features, properties, and the relation of elements exemplified in the following detailed disclosure.

DETAILED DESCRIPTION OF THE INVENTION

Figure 1:
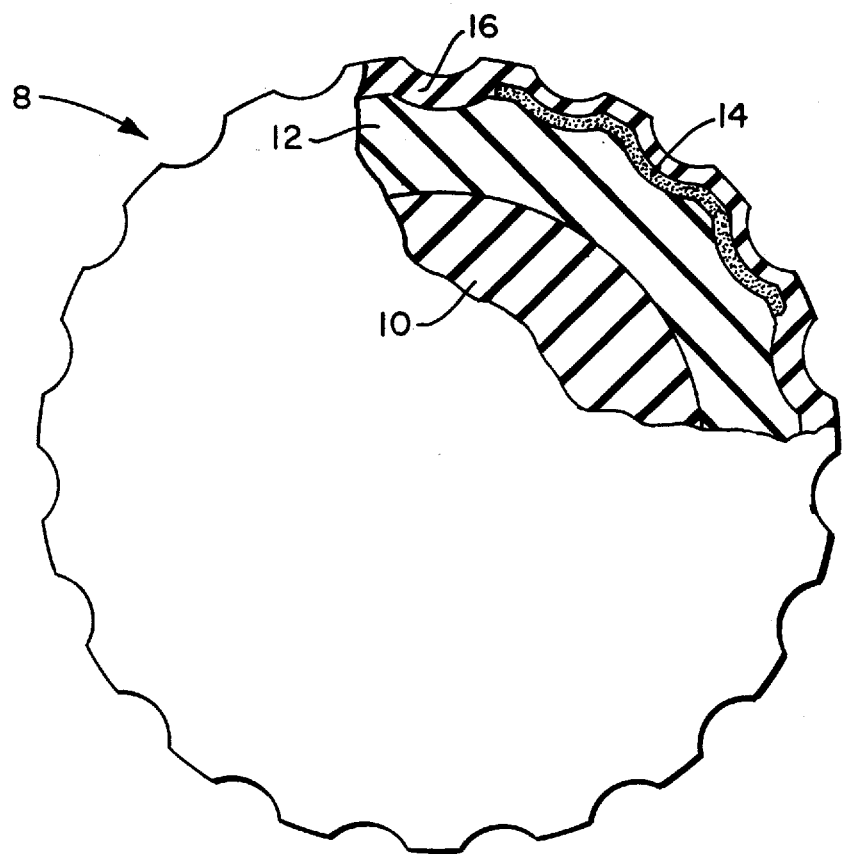
FIG. 1 shows a game ball having an indicia comprising a UV curable ink in accordance with the present invention.

Golf balls treated according to the method of the present invention are produced by any techniques known in the art, usually injection molding. Upon completion of the molding process, the outer surface of the unfinished golf ball will preferably be polyolefin rich, such as that resulting from a partially neutralized copolymer of ethylene and methacrylic acid (trademark SURLYN) or a partially neutralized copolymer of ethylene and acrylic acid (trademarks ESCOR and IOTEK). The copolymer also may include one or more additional types of monomers, such as acrylate esters, thus forming, for example, a terpolymer. These materials are known as ionomers. Other possible golf ball surfaces useful herein comprise polyamide, PVC, polyethylene, polyurethane, and epoxy- or acrylate-based outer surfaces. The term "unfinished golf ball" is used herein to refer to a golf ball after having been formed but before any finish coats such as conventional primers or top coats are applied. The unfinished golf balls may be white or colored. The unfinished golf balls are configured to have an identification mark or stamp formed thereon.

After application of an identification stamp comprising a radiation-curable ink, the unfinished golf balls are then exposed to irradiation by, for example, ultraviolet energy. After this exposure, a conventional top coat is applied, preferably but not necessarily without first applying a primer. A "primer" in the golf ball industry generally means a clear epoxy coating which improves the adhesion of a subsequent urethane top coat to the golf ball. The practice of the present invention enables the direct use of conventional top coats while avoiding the use of any primer coat.

The effect of the exposure of the golf ball cover to UV light is believed to be a chemical change of the preferably polyolefin-rich surface of the unfinished golf ball which increases the bonding energy of the surface and allows for better wetting and enhanced adhesion. Although not bound by any theory, it is believed that the golf ball surface is oxidized by exposure to the ultraviolet energy and that the oxidation increases the surface energy and polarity thereby introducing functional groups in and on the surface which groups are capable of interacting with conventional golf ball top coats. The resulting enhanced adhesion eliminates the need for a primer. Accordingly, when solvent-based primers would be used, the elimination of the primer can avoid volatile organic chemical emissions associated therewith. As shown below the test results show a clear improvement in coating adhesion after use of this invention as compared to untreated, unprimed golf balls.

Suitable top coats for use herein are those conventionally used in the golf ball industry. Generally such coatings are polyurethanes, more commonly polyester polyurethanes. Suitable polyesters typically are saturated and have a high degree of branching, although linear polymers are also useful, particularly as modifiers. The polyesters are crosslinked with materials such as aliphatic or aromatic polyfunctional isocyanates. While aqueous systems may be used, the coating components are more commonly dissolved in organic solvents such as ketones, esters or aromatics. Particularly useful solvents include methyl ethyl ketone, methyl amyl ketone, and the like. The coatings may further contain additives such as optical brighteners, ultraviolet light stabilizers, and the like, all as well known in the art.

As indicated above, when an identification mark comprising a UV curable ink is formed on the unfinished ball, the ink can be cured by exposing the mark to ultraviolet energy. While a number of commercially available UV inks may be useful, the UV curable inks which are described below in Examples 2–6 of the present invention are preferred in that they exhibit a combination of favorable transfer properties and good durability or impact resistance. The ink can be used for printing indicia on golf balls, and also on softballs, baseballs and other game balls, particularly on ionomeric resins. The ink also can be used on polybutadiene, synthetic leathers based on polyurethane or polyvinyl chloride, and other game ball cover materials.

As indicated above, the ink comprises a UV curable resin, a coloring agent, such as a pigment or dye, and a photoinitiator. A thinning agent which includes a monomer and/or a solvent can be added. If necessary, a wetting agent also can be included.

The UV curable resin preferably comprises an oligomer. Non-limiting examples of the oligomer include one or more epoxies, acrylics, acrylated urethanes, elastomeric acrylates, unsaturated polyesters, and polyethers. Specific examples of suitable oligomers include methacrylates such as bisphenol A ethoxylate dimethacrylate and acrylated epoxies. Blends of different oligomers can be used. The oligomer must provide the ink with characteristics of flexibility and impact resistance that are sufficient to withstand the conditions to which the substrate is to be subjected. For example, if the substrate is a golf ball, the oligomer must impart to the ink more flexibility than is inherent in the underlying substrate. When a top coat is to be placed over the ink, the ink should not be so highly cross-linked that adhesion of the top coat to the ink is substantially hindered.

The ink preferably comprises about 10–90 wt % oligomer, more preferably about 20–80 wt % oligomer, and most preferably about 50–70 wt % oligomer.

The coloring agent can be any type of pigment, dye or the like which will withstand UV treatment, i.e., which is not UV labile. Furthermore, the coloring agent should permit sufficient passage of UV light through the ink, by any combination of transmission, reflection, or refraction mechanisms, to initiate photocrosslinking. Liquids or powders can be used. One preferred form of the ink is a powder which is dispersed in liquid monomer. Carbon black and iron oxide black are non-limiting examples of suitable pigments for making black inks. Blends of different pigments and/or dyes can be used. The ink preferably contains about 2–60 wt % pigment, more preferably about 5–30 wt % pigment, and most preferably about 5–10 wt % pigment.

The photoinitiator is selected to respond to the wavelength of UV radiation to be used for photoinitiation. It is also important to consider the color of the ink in selecting the photoinitiator because, as indicated above, it is necessary for the UV light to penetrate in the ink composition to initiate the cure. More specifically, penetration is required in order to cure the portion of the ink which is beneath the surface. Penetration typically is most difficult when black or white pigments are used. Non-limiting examples of photoinitiators to be used in conjunction with black pigment include sulfur-type photoinitiators such as isopropyl thioxanthone, and benzophenone and its derivatives including acetophenone types and thioxanthones. Photoactivators can be used in conjunction with one or more photoinitiators. Non-limiting examples of suitable photoactivators are amine-type photoactivators such as ethyl 4-dimethylamino benzoate. The ink preferably contains about 0.3–5 wt % photoinitiator, more preferably about 1–4 wt % photoinitiator, and most preferably about 3–4 wt % photoinitiator. Blends of different photoinitiators, or photoinitiators and photoactivators, can be used.

A thinning agent is added if it is needed to lower the viscosity of the uncured ink composition or to contribute to impact resistance or flexibility. When monomer is used as a thinning agent, it should be a photopolymerizable monomer which forms a polymeric structure upon irradiation. In contrast, when solvents are used as thinning agents, they evaporate during curing. The monomer can be a monofunctional, difunctional or multifunctional acrylate. Non-limiting examples of suitable monomers include 1,6 hexane dioldiacrylate, butane dioldiacrylate, trimethylol propane diacrylate, tripropylene glycol diacrylate and tetraethylene glycol diacrylate.

The ink preferably contains about 10–70 wt % monomer, more preferably about 10–60 wt % monomer, and most preferably about 10–55 wt % monomer. Preferably, the combination of monomer plus oligomer constitutes about 45–80 wt % of the ink, more preferably about 50–80 wt %, and most preferably about 60–80 wt % of the ink.

When a solvent is used, it typically is a liquid with a fast to moderate evaporation rate which, upon partial evaporation causes the ink to be tacky, and thereby promotes transfer onto and off an ink pad. Solvent also can be the medium in which photoinitiator is dissolved. Non limiting examples of suitable solvents include aromatic solvents such as toluene, xylene, and ester types such as butyl acetate. The ink preferably includes about 1–30 wt % solvent, more preferably about 5–20 wt % solvent, and most preferably about 8–10 wt % solvent.

Wetting agents can be added if necessary to prevent beading of the ink upon application to the golf ball. Suitable wetting agents include, but are not limited to, silicon surfactants and fluorocarbon surfactants. The ink preferably includes about 0–2 wt % wetting agent. Other additives that do not adversely affect the pad transfer and impact resistance of the ink also can be incorporated into the ink composition.

Extender pigments such as talc, barium sulfate and the like can be added as long as sufficient durability is maintained. Such materials may be used to improve transferability. Typically, if such materials are used, they together constitute about 10–40 wt %, or more preferably 20–30 wt %, of the ink formulation.

It has been found that by replacing extender pigments such as talc and barium sulfate with aluminum trihydroxide ($Al_2O_3(H_2O)_3$) (ATH) filler, a number of significant improvements to the UV ink will result. More specifically, the inclusion of ATH will result in an ink with reduced opacity. Furthermore, ATH has low oil absorption, and viscosity is increased very little by the inclusion of ATH. When up to at least 32 wt % ATH based upon the weight of (uncured) ink is added, ink transfer from a pad to a substrate was found to improve as the ATH content was increased. It is believed that ATH loadings up to at least 50 wt % based upon the weight of (uncured) ink may be useful for overall balance of properties. Significantly, ATH does not absorb UV light so curing of the ink is not impeded by the inclusion of this material.

The surface tension of the ink affects pad transfer. The surface tension of the ink should not be substantially higher than the surface tension of the substrate upon which it is printed. The viscosity of the ink will determine the thickness of the indicia on the cover. If the indicia is too thick, the UV radiation will not penetrate the indicia and complete curing may become difficult. On the other hand, if the indicia is too thin, the durability of the ink layer may be insufficient for conditions of play. The indicia has a thickness of less than 100 microns, preferably about 10–40 microns, more preferably 13–30 microns, and most preferably 20–25 microns.

The cured ink should be sufficiently flexible that it exhibits good impact resistance. It is advantageous for the top coat which is applied over the ink to react with the ink to hold the ink in place, or to have adhesion by hydrogen bonding and/or Van Der Waals forces. As a non-limiting example, the ink can be used in conjunction with a two component polyurethane top coat, such as a top coat based on polyester or acrylic polyols and aliphatic isocyanates such as hexamethylene diisocyanate or isophorane diisocyanate trimers.

It is essential for a top coat to be applied over the indicia to protect the indicia unless the indicia has sufficient adhesion to the surface to which it is applied. e.g., the cover or a primer layer, to render the use of a top coat unnecessary. The adhesion between the ink and the top coat and/or substrate should be sufficiently strong that the indicia remains substantially intact when the game ball is used. Standards for image retention vary depending upon the intended use of the game ball and the degree and frequency of impact that the image is required to withstand. When applied to a golf ball, the ink durability should be sufficient in order that after the ball is subjected to the wet barrel durability test procedure described below, at least 50% of the surface area of the original image remains, more preferably at least 70%, and most preferably at least 80%.

A formulation of UV curable ink of the invention which is for golf ball printing is prepared and used in the following way. The photoinitiator is dissolved in the thinning agent, which is then mixed with oligomer and pigment. The mixture is placed in an open or closed cup dispenser of a pad printing device. An unfinished golf ball such as that shown in FIG. 1, which is designated as 8, is obtained. The ball 8 includes, for example, a core 10, and a durable cover layer 12 having a dimpled surface. Alternatively, the core and cover can be formed in one piece, or a multi-layer core and/or cover can be employed. An indicia 14 is pad printed over the golf ball cover 12. The ink indicia can either be stamped directly on the cover or can be stamped on a primer which is placed over the cover. The entire surface of the unfinished golf ball 8 is then subjected to UV treatment under conditions sufficient to improve adhesion of a top coat to the surface 8 and to commence curing of the ink. After photoinitiation, curing of the ink is substantially complete within a time period of between less than one second and a few seconds.

After UV treatment, a top coat layer 16 is placed over the golf ball surface. The top coat layer 16 assists in keeping the indicia on the golf ball surface, as indicated above, and therefore the adhesion of indicia to the golf ball does not need to be as strong as would be required if the ink were to constitute the outer layer of the ball. The top coat typically has a thickness of 10–40 microns.

Figure 2:
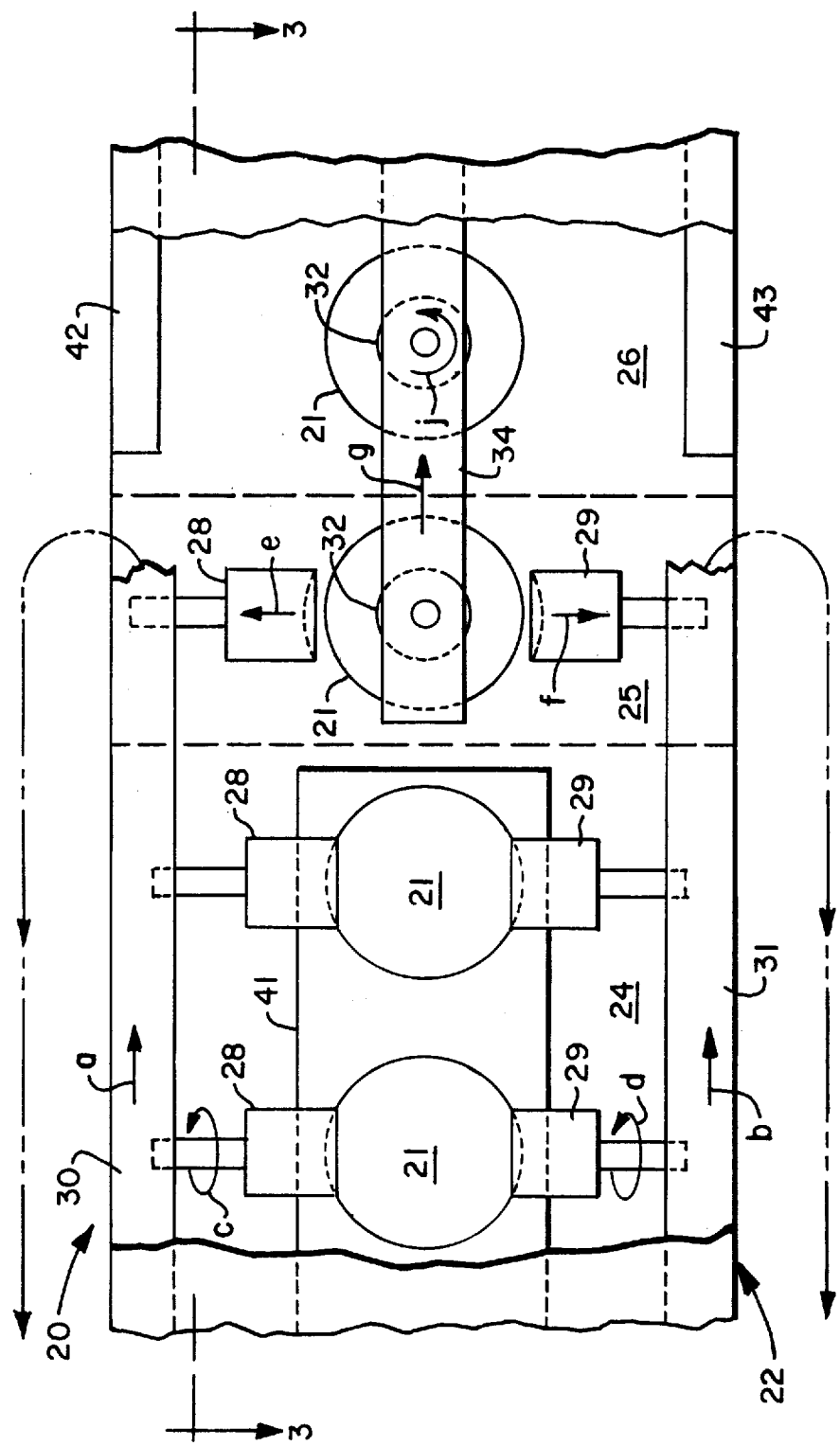
FIG. 2 is a schematic side elevational view, partially broken away, of the transition portion between two treatment zones of an apparatus for UV treating golf balls in accordance with the present invention.
Figure 3:
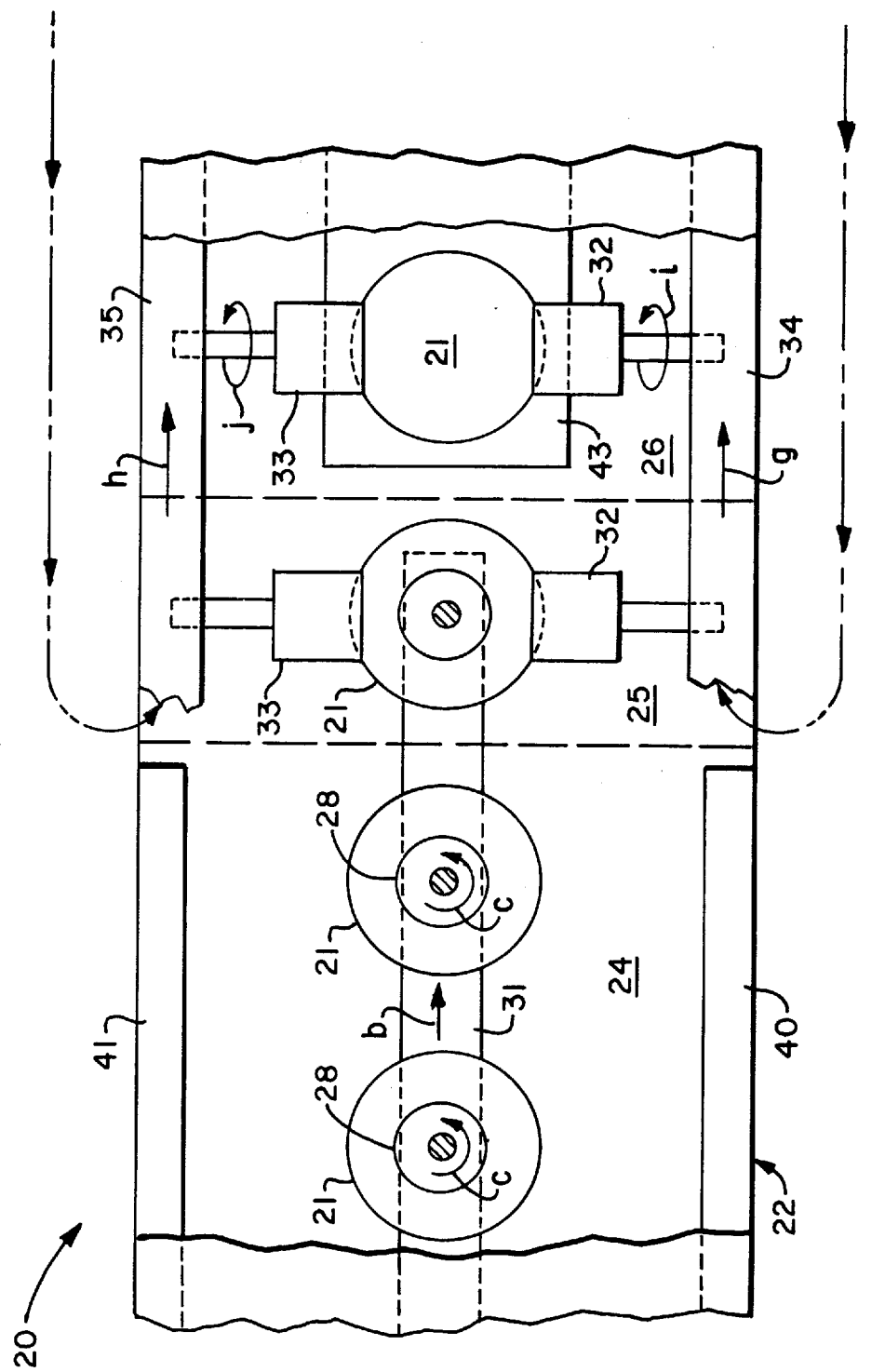
FIG. 3 is a section view taken along line 3—3 of FIG. 2.
Figure 4A:
FIG. 4 shows the differences in pad transfer of four UV-curable inks.
Figure 4B:
Figure 4C:
Figure 4D:

An apparatus 20 for continuously UV treating a number of golf balls is shown schematically in FIGS. 2–3. A ball 21 travels along a UV treatment line 22 which includes a first UV treatment zone 24, a transitional zone 25 and a second UV treatment zone 26. In the first UV treatment zone 24, each ball 21 is sandwiched between a pair of opposite, vertical, inwardly-extending spindles 28, 29. The downwardly extending spindles 28 are mounted on a longitudinally moving conveyor 30, which moves in the direction of arrow a. The upwardly extending spindles 29 are mounted on a longitudinally moving conveyor 31, which moves in the direction of arrow b. As they move longitudinally at the same rate, the spindles 28, 29 rotate in the same direction at the same rate in order to rotate the balls 21 along their vertical axis in the rotational direction of arrows c and d. UV lamps 40, 41 are positioned along opposite sides of the first UV treatment zone 24, thereby exposing the sides of the balls 21 to UV radiation as the balls rotate. Most of UV lamp 40 has been removed in the view shown in FIG. 2. The balls 21 are rotated a minimum of 90° in the first UV treatment zone 24. Thus, in the first UV treatment zone 24, at least 50% of the surface of each ball 21 is UV treated to improve adhesion and cure any UV curable ink indicia which is present on the UV-treated surface.

When the balls leave the UV treatment zone 24, they enter their transitional zone 25. In the transitional zone 25, a pair of opposite, horizontal, inwardly-extending spindles 32, 33 sandwich each ball 21. After a pair of spindles 32, 33 fully supports a particular ball 21, the vertical spindles 28, 29 which have been in contact with the ball 21 are retracted in the directions shown by arrows e and f, respectively. The conveyors 30, 31 which support the spindles 28, 29 then return the spindles 28, 29 to the first UV treatment zone 24. The horizontal spindles 32 are mounted on a longitudinally moving conveyor 34, which moves in the direction shown by arrow g from the transitional zone 25 into the second UV treatment zone 26. The horizontal spindles 33 are mounted on a longitudinally moving conveyor 35, which moves in the direction shown by arrow h from the transitional zone 25 into the second UV treatment zone 26. As they move longitudinally at the same rate, the spindles 32, 33 rotate in the same direction and at the same rate in order to rotate the ball 21 along a horizontal axis in the rotational direction of arrows i and j, respectively. UV lamps 42, 43 are positioned along the top and bottom, respectively, of the second UV treatment zone 26, thereby exposing the tops and bottoms of the balls 21 to UV radiation as the balls rotate. The balls 21 rotate a minimum of 90° in the second UV treatment zone 26. In the second UV treatment zone 26, at a minimum, the portion of each ball 21 surface which was not UV treated in the first UV treatment zone is UV treated in order to improve adhesion and cure any UV curable ink indicia which is present on the treated surface.

The preferred conditions of UV exposure which are appropriate to cure the ink when the remainder of the golf ball surface is not to be irradiated can be ascertained by one having ordinary skill in the art. For example, it has been found that when a golf ball passes through a UV treatment apparatus at a rate of 10 ft/min. at a distance of about 1¼–1¾ inches from a UV light source which has an intensity of e.g. 200–300 watts/in$^2$, the indicia only needs to be exposed to UV radiation for a few seconds or less, preferably, no more than about 1 second, and more preferably no more than about 0.7 seconds. Higher and lower UV lamp intensities may be used as long as the cured ink meets the applicable durability requirements. Excess UV exposure is avoided in order to prevent degradation of the substrate. The ink is UV cured prior to application of any top coat.

The conditions of UV exposure which are appropriate to simultaneously improve adhesion of the golf ball surface and cure the ink are generally the same as the conditions which are used when the remainder of the golf ball surface is not to be irradiated. When a golf ball passes through a UV treatment apparatus at a rate of 1–25 ft/min and more preferably 5–15 ft/min at a distance of about one to five inches from a UV light source which has an intensity of e.g. 100 to 400 watts/in$^2$, the golf ball surface and indicia generally is exposed to UV radiation for one to ten seconds, preferably one to five seconds, and more preferably one to two seconds. Higher and lower UV lamp intensities may be used as long as the ink is crosslinked and not transferable in the even adjacent balls rub together.

The pad to be used for transfer of the UV ink preferably contains silicone. This type of pad has good elasticity, durability and softness and an appropriate surface tension. Other types of pads also can be used.

The ink can be applied on a non-UV-labile surface of a game ball. According to the invention, it is generally not necessary to pretreat the surface prior to application of the ink. If it is desired to apply the UV curable ink on an extremely smooth surface upon which transfer is poor, the portion of the surface to be stamped can be chemically or physically etched or abraded in order to provide an ink-receptive surface.

The ink of the invention has a sward hardness after curing of no more than 40, more preferably no more than 20, and most preferably no more than about 14. The UV curable ink of the invention provides for durability sufficient to meet stringent durability standards required for commercial grade golf balls. The durability of the ink can be determined by testing stamped golf balls in a variety of ways, including using the wet barrel durability test procedure.

The wet barrel durability test is performed by first soaking (immersing) the test golf balls in water for at least 3 hours. Thereafter each ball is fired 100 times at a velocity of 134 ft/sec at 72° F into a five-sided container, the walls of which are steel plates that have had grooves milled therein to simulate the grooves present on a golf club face. The balls are then examined for adhesion of the ink.

The following examples illustrate various aspects of the present invention. The examples are provided for the purpose of illustration and are not meant to be limiting.

EXAMPLE 1

UV Treatment of Unfinished Golf Ball Cover 108 golf balls were made by a conventional injection molding process well known to those skilled in the art. The unfinished golf balls were produced having an outer layer of a mixture of partially neutralized copolymers of ethylene and acrylic acid (trademark ESCOR or IOTEK). The balls had conventional dimples.

Six groups of 18 golf balls each were subjected to ultraviolet light for different periods of time ranging in increments of 60, 120, 240, 300, 480 and 540 seconds. The exposures were carried out by placing the balls on a work table in a SEN Photo-Surface Processor Model No. PL12-200 which emits UV light simultaneously predominantly at two specific wavelengths, 184.9 nanometers and 253.7 nanometers. The work table was rotated, i.e. turned over, mid-way through each exposure to assure complete exposure of the unfinished golf ball surface to the UV energy. It is contemplated that other conventional work tables, such as a stationary work table or conveyor belt, would work equally well. The balls treated with UV light were then coated with a conventional clear polyurethane golf ball top coat. The top coat was a solvent (methyl amyl ketone) -borne two-part saturated polyester polyurethane.

The above-prepared golf balls were then tested for finish durability and compared to control unfinished golf balls made by the same process. One group of controls was neither primed nor treated with UV light prior to application of the top coat. The second set of controls was primed but not treated with UV light before application of a top coat. The 108 treated balls and the controls were then subjected to a "Wet Barrel Durability Test" for coating adhesion. In particular, three groups of balls were tested and compared: (1) untreated, unprimed balls, (2) untreated, primed balls and (3) UV-treated, unprimed (6 groups of 18 balls each). "Untreated" means the balls were not exposed to UV light as taught by the instant invention. The results are shown in Table I below in which the time of the UV treatment is indicated in seconds of exposure:

TABLE I

| Untreated Unprimed | Untreated Primed | Treated by UV Unprimed | | | | | |
|---|---|---|---|---|---|---|---|
| | | 60 | 120 | 240 | 300 | 480 | 540 |
| PC-4 | PC-0 | PC-2 | PC-0 | PC-0 | PC-0 | PC-3 | PC-3 |

The Wet Barrel Durability Test grading system was:

| Grade | Definition |
| --- | --- |
| PC-0 | No lifting or cracking in dimples or on lands |
| PC-1 | Lifting or cracking in at most 1 dimple |
| PC-2 | Lifting or cracking 1 to 3 dimples |
| PC-3 | Lifting or cracking in excess of 3 dimples and/or lands |
| PC-4 | Complete lifting of both lands and dimples in sheets of 1/4" or more |

The Wet Barrel Durability Test was performed by first soaking (immersing) the test golf balls in water for at least 3 hours. Thereafter each ball is fired 100 times at a velocity of 135 ft/sec at 72° F. into a five-sided container, the walls of which are steel plates that have had grooves milled therein to simulate the grooves present on a golf club face. The balls are then evaluated for durability.

Golf balls rated PC-0 and PC-1 are acceptable for top grade. Balls rated PC-2 and PC-3 are acceptable for downgrades only. Balls rated PC-4 are rejected for all current commercial products.

Golf balls which were not treated with UV light and which had no primer applied (Untreated, Unprimed in Table I) had a grading of PC-4 which is complete lifting of both lands and dimples in sheets of ¼" or more. This grading makes the product commercially unacceptable for even the lowest grade of golf ball.

Golf balls which were not treated with UV light but did have a coat of primer (Untreated, Primed in Table I) had a grading of PC-0 which means no lifting or cracking in dimples or on lands. This is the premium grade and is acceptable for top grade golf balls.

Golf balls treated with UV light as described herein with no primer (Treated by UV, Unprimed in Table I) had varying grades depending upon the exposure time. It is apparent that unlimited UV light exposure is undesirable. Those golf balls having an exposure time greater than about 60 seconds but less than about 480 seconds were rated PC-0 which means no lifting or cracking was observed in dimples or on lands. The Wet Barrel Durability Test results obtained are at least as good as the previously best known technology which involved application of a primer. Golf balls treated as described in the present invention but exposed for a period of less than about 120 seconds or more than about 540 seconds received a grading of PC-2 and PC-3 respectively. Both of these results are adequate for use as "downgrade" golf balls and are better than golf balls which have been neither treated with UV light nor primed. As such, the optimum exposure time should be greater than about 60 but less than 480 seconds.

EXAMPLE 2
UV Ink for Game Ball
A golf ball printing ink was prepared which contains:
5 parts by weight 1,6 hexane dioldiacrylate (sold by Sartomer, Exton, Pa. 19341),
17.5 parts by weight black pigment paste in diacrylate monomer, sold as Carbon Black UV Dispersion 99B415 (Penn Color, Doylestown, Pa.),
35 parts by weight of an aliphatic urethane acrylate oligomer (CN965, sold by Sartomer, Exton, Pa. 19341).
0.5 parts by weight isopropyl thioxanthone, $C_{16}H_{14}OS$, a sulfur-type photoinitiator (ITX, distributed by Aceto Chemical, Lake Success, N.Y.),
1 part by weight ethyl 4-dimethylamino benzoate, $CH_{11}H_{15}NO_2$, an amine-type photoactivator (EDB, distributed by Aceto Chemical, Lake Success, N.Y.),
4.4 parts by weight xylene solvent, and 4.4 parts by butyl acetate solvent.

The photoinitiator and photoactivator were dissolved in the xylene/butyl acetate solvent blend. The ink was pad printed using a silicone pad on unprimed, dimpled ionomeric covers of several dozen golf balls. The ink had a viscosity of about 27,500 (centipoise) cps at the time of application. The balls containing the stamped indicia were passed through a Uvex UV treatment apparatus Lab Model #14201 at a rate of 10 feet/min, using a lamp intensity of 235 watt/in$^2$ and wavelength range of 200–400 nm with the indicia being located about 1¾ inches from the UV light source. The ink was cured in less than about 1 second and had a sward hardness of about 14 after curing was complete. The golf balls were then coated with a solvent borne polyurethane top coat formed from a polyester type hexamethylene diisocyanate. The adhesion of the indicia on the balls was tested for durability according to the wet barrel durability test procedure described above. After wet barrel durability testing, the balls were examined and it was found that no more than about 20% of the surface area of the original ink logo was removed.

EXAMPLE 3
UV Ink for Game Ball
The procedure of Example 2 was repeated with the exception that the ink formulation that was used contained:
10 parts by weight 1,6 hexane dioldiacrylate (sold by Sartomer),
35 parts by weight black pigment paste in diacrylate monomer, sold as Carbon Black UV Dispersion 99B415,
70 parts by weight of a difunctional aliphatic urethane acrylate oligomer (Ebecryl 4833, RadCure, Smyrna, Ga.),
1 part by weight isopropyl thioxanthone, $C_{16}H_{14}OS$ (ITX), and
2 parts by weight ethyl 4-dimethylamino benzoate (EDB).
The ink had a viscosity of about 25,000 cps. The ink was cured in about 1 second and produced a film having a sward hardness of about 12. The balls were subjected to the wet barrel durability test procedure. After the wet barrel durability testing, it was found that no more than about 20% of the ink logo was removed.

EXAMPLE 4
UV Ink for Game Ball
The procedure of Example 2 was repeated with the exception that the CN965 oligomer was replaced by a difunctional oligomer sold as Ebecryl 8402 (Rad-Cure, Smyrna, Ga.). The ink had a viscosity of about 18,000 cps. The ink was cured in about 1 second and produced a film having a sward hardness of about 14. The ink was found to be as nearly as durable as that of Examples 1 and 2.

EXAMPLE 5
UV Ink for Game Ball
The procedure of Example 2 was repeated with the exception that the ink formulation that was used contained:
7.3 parts by weight 1,6 hexane dioldiacrylate (sold by Sartomer, Exton, Pa. 19341),
19.2 parts by weight black pigment paste in diacrylate monomer, sold as ICU 386 BLK (Industrial Color Ink, Joliette, Ill.),
21.0 parts by weight aliphatic polyether urethane oligomer (BR-571, Bomar Specialties Company, Winsted, Conn.),
0.5 parts by weight isopropyl thioxanthone, $C_{16}H_{14}OS$, a sulfur-type photoinitiator (ITX, distributed by Aceto Chemical, Lake Success, N.Y.), 1 part by weight ethyl 4-dimethylamino benzoate (EDB), 11.4 parts by weight talc (Van Talc 6H, Vanderbilt, Norwalk, Conn.), 22.9 parts by weight barium sulfate (106 Low-Micron White Barytes, Whittaker, Clark & Daniels, Inc., South Plainfield, N.J.), 12.1 parts by weight butyl acetate solvent, and 4.6 parts by weight propylene glycol monomethyl ether acetate solvent.

The ink was applied directly to ionomeric covers of golf balls, and also over ionomeric covers to which a water borne polyurethane primer layer had been applied prior to application of the ink. The ink was cured in about 1 second and produced a film having a sward hardness of about 14. The balls were top coated and subjected to the wet barrel durability test procedure. After the wet durability testing, it was found that no more than about 20% of the ink logo was removed.

COMPARATIVE EXAMPLE 1
UV Ink

The procedure of Example 2 was repeated with the exception that a commercially available UV curable ink was used, namely Blk #700801 (Trans Tech, Carol Stream, Ill.). The ink had a viscosity of about 6,000 cps. The ink was cured in about 1 second and produced a film having a sward hardness of about 26. After the wet barrel durability test only the outline of the logo remained. Most of the ink in the dimples and on the land areas had been removed. Intercoat adhesion between the ink and top coat was poor.

COMPARATIVE EXAMPLE 2
UV Ink

The procedure of Example 2 was repeated on several golf balls with the exception that a commercially available UV curable ink was used, namely L-526-163-B (Qure Tech, Seabrook, N.H.). The ink had a viscosity of about 28,500 cps. The ink was cured in about 1 second and produced a film having a sward hardness of about 20. As a result of the wet barrel durability test, the ink on at least about 60% of the surface area of the logo had been removed. It is believed that the ink was too brittle to withstand the conditions of the wet barrel durability test.

EXAMPLE 6
UV Ink Containing ATX for Game Ball

ATH-Containing Formulation 1, shown below was prepared:

| ATH-Containing Formulation 1 | Parts by weight |
|---|---|
| Acrylic —OH functional Resin[1] | 540.5 |
| Acetate and aromatic hydrocarbon solvent blend[2] | 189.2 |
| ATH[3] | 270.3 |
| | 1000.0 |

[1]McWorther Resin 975 (McWorther, Inc., Carpentersville, IL)
[2]Summit Ink Reducer, Summit PT #910527 (Summit Screen Inks, No. Kansas City, MO) Alternatively, a mixture based upon 43.4 parts by weight butyl acetate, 28.3 parts by weight xylene and 28.3 parts by weight propylene glycol monomethyl ether acetate can be used.
[3]ATH Spacerlite S-3 (ALCOA Industries, Bauxite, AR)

The ATH-Containing Formulation 1 was then used to form a golf ball ink which contained:

5 parts by weight aliphatic urethane triacrylate (BR-990, Bomar Special ties Co., Winsted, Conn.), 35 parts by weight ATH-Containing Formulation 1, 5.5 parts by weight trimethylolpropane triacrylate (TMPTA) (Sartomer Co., West Chester, Pa.)

5 parts by weight black dispersion in oligomer/monomers (ICU 386, Industrial Color Inc., Joliette, Ill.), 0.3 parts by weight isopropyl thioxanthone, $C_{16}H_{14}OS$, a sulfur-type photoinitiator (ITX, distributed by Aceto Chemical, Lake Success, N.Y.), 1 part by weight ethyl 4-dimethylamino benzoate, $C_{11}H_{15}NO_2$, an amine-type photoactivator (EDB, distributed by Aceto Chemical, Lake success, N.Y.), and 10 parts by weight ATH (Spacerlite S-3, ALCOA Industries, Bauxite, Ariz.).

All ingredients were mixed and dispersed on high speed mixing equipment.

The ink was pad printed using a silicone pad on unprimed, dimpled ionomeric covers of several dozen golf balls. The balls containing the stamped indicia were passed through a Uvex UV lamp at a rate of 10 feet/min., using a lamp intensity of 235 watt per inch$^2$ and a wavelength range of 200–400 nm with the indicia being located about 1¾ inches from the UV light source. The ink was cured in less than one second. The golf balls were then coated with a two component polyester/aliphatic polyisocyanate clear coat. The printability, jetness, detail image, pad release, and durability of the ink was evaluated and was compared with three sets of control inks, designated as Control A, Control B, and Control C. The formulations of the Control A and Control B inks are shown below:

| Control A | |
|---|---|
| | parts by wt. |
| Aliphatic urethane-acrylic oligomer[1] | 6.45 |
| Acrylic —OH functional resin[2] | 42.96 |
| Acetate and aromatic hydrocarbon solvent blend[3] | 8.85 |
| Talc[4] | 5.59 |
| Barium sulfate[5] | 12.89 |
| Black dispersion in oligomer/monomer[6] | 6.01 |
| TMPTA[7] | 15.18 |
| Isopropyl thioxanthone[8] | 0.69 |
| Ethyl 4-dimethylamino benzoate[9] | 1.38 |
| | 100.00 |

[1]BR-571 (Bomar Specialties Co., Winstead, CT)
[2]McWorther Resin 975 (McWorther, Inc., Carpentersville, IL)
[3]Summit Ink Reducer (Pt# 910527, Summit Screen Inks, No. Kansas City, MO)
[4]Van Talc #6H (Vanderbilt, Norwalk, CT)
[5]Barytes #22 (Whittaker, Clark & Daniels, Inc., South Plainfield, NJ)
[6]ICU 386 (Industrial Color Inc., Joliette, IL)
[7](Sartomer Co., West Chester, PA)
[8]ITX (distributed by Aceto Chemical, Lake Success, NY)
[9]EDB (distributed by Aceto Chemical, Lake Success, NY)

| Control B | |
|---|---|
| | parts by wt. |
| Epoxy-acrylate oligomer[1] | 19.24 |
| Acrylic —OH functional resin[2] | 27.70 |
| Acetate and aromatic hydrocarbon solvent blend[3] | 13.84 |
| Talc[4] | 7.69 |
| Barium sulfate[5] | 7.69 |
| Black dispersion in oligomer/monomer[6] | 6.15 |
| Polyester-acrylate oligomer[7] | 15.38 |
| Isopropyl thioxanthone[8] | 0.77 |

-continued

| Control B | |
|---|---|
| | parts by wt. |
| Ethyl 4-dimethylamino benzoate[9] | 1.54 |
| | 100.00 |

[1]Ebecryl 3700 (Rad-Cure, Smyrna, GA)
[2]McWorther Resin 975 (McWorther, Inc., Carpentersville, IL)
[3]Summit Ink Reducer (Pt# 910527, Summit Screen Inks, No. Kansas City, MO)
[4]Van Talc 6H (Vanderbilt, Norwalk, CT)
[5]Barytes #22 (Whittaker, Clark & Daniels, Inc., South Plainfield, NJ)
[6]ICU 386 (Industrial Color Inc., Joliette IL)
[7]Ebecryl 80 (Red-Cure, Smyrna, GA)
[8]ITX (distributed by Aceto Chemical, Lake Success, NY)
[9]EDB (distributed by Aceto Chemical, Lake Success, NY)

Control C was Trans Tech ink #2P37-2 (Trans Tech, Carol Stream, Ill.). The ratings for the various ink formulations are shown below:

| Ink | Printability | Jetness | Detail Image | Pad Release | Durability |
|---|---|---|---|---|---|
| Example 6 | 1 1/2 | 1 | 1 | 1 1/2 | 1 |
| Control A | 2 1/2 | 2 1/2 | 2 | 2 1/2 | 1 |
| Control B | 3 | 2 1/2 – 3 | 2 1/2 | 3 | 2 1/2 |
| Control C | 1 1/2 – 2 | 1 | 1 | 1 1/2 – 2 | 2 1/2 |

Ratings were from 1–5 with 1 being ideal and 5 being unacceptable. All of the balls of Example 6 and the balls of Controls A, B and C were covered with a one-coat top coating system of 160mg, the top coating being a two component polyester/aliphatic polyisocynate clear coat.

The ink of Example 6 had a oligomer/monomer content of 22.608%, an acrylic resin content of 21.508%, a black pigment content of 3.08 wt %, an ATH pigment content of 31.63 wt %, a solvent content of 20.008% and an initiator content of 1.62 wt %. The density of the ink was 10.68 lbs./gal., the total nonvolatiles content was 80%, and the volatile organic compounds constituted 2.14 lbs./gal. The viscosity of the ink was 11,000 centipoise at the time of application. After curing, the smudge resistance of the ink was tested using methyl ethyl ketone solvent. No smudging occurred.

It has been found that the solvent content of the ink can be significantly increased without reducing the quality of the identification stamp. For example, by further reducing the ink by 30% (by adding solvent), the viscosity of the ink will decrease to about 1420 centipoise. An ink with this low viscosity tends to have better printability than more viscous inks on certain pad printing machines.

FIG. 4 shows a silicone pad after 12 golf balls have been stamped with a particular type of ink. FIG. 4-A shows the stamp after stamping with the ink of Control A. FIG. 4-B shows the silicone pad after stamping with the ink of Control B. FIG. 4-C shows the pad after stamping with the ink of Example 6. FIG. 4-D shows the pad after stamping with Control C. As indicated by the resulting stamps, the best transfer, i.e. the least quantity of ink remaining on the stamp, resulted from the use of the ink of Example 6.

(PROPHETIC) EXAMPLE 7

Simultaneous Curing of UV Ink and UV Treatment of Unfinished Golf Ball Surface to Improve Adhesion Five dozen golf balls are made having polybutadiene solid centers and a single cover layer of ionomer. The ionomer is a blend of hard ionomers. Soft and hard/soft blends of ionomers also can be used. The balls have conventional dimples.

One dozen unprimed, non-top coated golf balls are stamped with the UV ink of Example 6 above and within a few seconds thereafter the entire outer surface of the ball is subjected to UV light by passing the ball through the same type of Uvex UV lamp used in Examples 5 and 6 at a rate of 10 ft/min, using a lamp intensity of 235 watt/in$^2$ and a wavelength range of 200–400 nm with the indicia being located 1¾ inches from the UV light source. The exposures are carried out in the apparatus shown in FIGS. 2–3 in order to UV treat the entire surface of each ball. The balls treated with UV light are then coated with a two component polyester/aliphatic polyisocyanate clear top coat.

The above procedure is repeated with the remaining balls, varying the type of ink used. More specifically, each of the inks of Examples 2–5 is stamped on one dozen golf balls and the balls are UV exposed under the conditions described in the previous paragraph.

The above-prepared golf balls are then tested for finish durability and compared to control golf balls. The group of controls is neither primed nor treated on its entire surface with UV light prior to application of the top coat. Instead, only the indicia is UV treated. The treated balls and controls are then subjected to a wet barrel durability test for coating adhesion. The test is the same test as was used, and is described, in Example 1.

For the five dozen golf balls which are UV treated on their entire surface, the UV ink is sufficiently cured and the UV exposure of the unprimed cover surface results in improved adhesion of the top coat relative to the unprimed control balls which did not receive UV treatment on their entire surface.

As will be apparent to persons skilled in the art, various modifications and adaptations of the structure above described will become readily apparent without departure from the spirit and scope of the invention, the scope of which is defined in the appended claims.

What is claimed is:

1. A golf ball having a molded, UV-light-exposure-modified outer surface with an array of undamaged dimples and surrounding land areas disposed thereon, an indicia formed on the outer surface comprising a UV curable ink, and a top coat firmly adhered directly to said UV-light-exposure-modified outer surface, the top coat exhibiting resistance to cracking at both the dimples and land areas.

2. A golf ball according to claim 1, wherein the ball has a durability comparable to the durability of a golf ball having a non-UV-light-exposure-modified outer surface having the same outer surface and top coat compositions.

3. A golf ball according to claim 1, wherein the ball exhibits a top coat adherence at a level less than PC-3 as determined by the Wet Barrel Durability Test procedure.

4. A golf ball according to claim 1, wherein the ball exhibits a top coat adherence at a level less than PC-2 as determined by the Wet Barrel Durability Test procedure.

5. A golf ball according to claim 1, wherein the UV-light-exposure-modified outer surface comprises a polyolefin.

6. A golf ball according to claim 1, wherein the UV-light-exposure-modified outer surface comprises an ionomer.

7. A golf ball having a molded, radiation-modified outer surface comprising a neutralized copolymer of ethylene and at least one of methacrylic acid and acrylic acid, an indicia formed on the outer surface comprising a radiation-curable ink, and a top coat firmly adhered over the radiation-modified outer surface.

8. A golf ball according to claim 7, wherein the ball exhibits a top coat adherence at a level less than PC-3 as determined by the Wet Barrel Durability Test procedure.

9. A golf ball according to claim 7, wherein the ball exhibits a top coat adherence at a level less than PC-2 as determined by the Wet Barrel Durability Test procedure.

10. A method for simultaneously improving the adhesion of a coating to an unfinished golf ball surface and applying an indicia to said surface, the method comprising the steps of applying a UV-curable indicia to a portion of said surface and subsequently subjecting said surface to a sufficient degree of UV radiation for a sufficient period of time to both cure the indicia and enhance the adhesion of the subsequent coating.

11. The method of claim 10 wherein the unfinished golf ball surface is a partially neutralized copolymer of ethylene and methacrylic acid or a partially neutralized copolymer of ethylene and acrylic acid.

12. The method of claim 10 wherein the coating is a polyurethane.

13. A method of making a finished golf ball from an unfinished golf ball without use of a primer coating, said method comprising the steps of (i) forming an indicia on the unfinished golf ball, said indicia comprising a radiation-curable ink, (ii) subjecting the unfinished golf ball to irradiation under conditions sufficient to cure the indicia and enhance adhesion of a subsequent coating, and (iii) after irradiation, placing a finish coating on the unfinished golf ball.

14. A method according to claim 13, wherein the unfinished golf ball has an outer surface which comprises a polyolefin.

15. A method according to claim 13, wherein the unfinished golf ball has an outer surface which comprises a partially neutralized copolymer of ethylene and methacrylic acid or a partially neutralized copolymer of ethylene and acrylic acid.

16. A method of treating a game ball surface comprising the steps of (i) forming an indicia on said surface, said indicia comprising a radiation-curable ink, and (ii) exposing the surface and the indicia to irradiation under conditions sufficient to both cure said indicia and enhance adhesion of said surface to a subsequent coating.

17. A method according to claim 16, wherein said surface comprises a partially neutralized copolymer of ethylene and methacrylic acid or a partially neutralized copolymer of ethylene and acrylic acid.

18. A game ball having a UV-light-exposure-modified outer surface, an indicia formed on the outer surface comprising a UV curable ink, and a top coat firmly adhered directly to the UV-light-exposure-modified outer surface.

19. A game ball according to claim 18, wherein the outer surface comprises a polyolefin.

20. A game ball according to claim 18, wherein the outer surface comprises an ionomer.

* * * * *